US011506809B2

(12) United States Patent
Alruwaili et al.

(10) Patent No.: US 11,506,809 B2
(45) Date of Patent: Nov. 22, 2022

(54) SYSTEM AND METHOD FOR ACOUSTICALLY IMAGING WELLBORE DURING DRILLING

(71) Applicant: Saudi Arabian Oil Company, Dhahran (SA)

(72) Inventors: Khalid Mohammed Alruwaili, Dhahran (SA); Murtadha J. AlTammar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 358 days.

(21) Appl. No.: 16/887,150

(22) Filed: May 29, 2020

(65) Prior Publication Data

US 2021/0373188 A1   Dec. 2, 2021

(51) Int. Cl.
*G01V 1/46* (2006.01)
*G01V 1/50* (2006.01)

(52) U.S. Cl.
CPC ............. *G01V 1/46* (2013.01); *G01V 1/50* (2013.01); *G01V 2200/16* (2013.01); *G01V 2210/6222* (2013.01); *G01V 2210/641* (2013.01)

(58) Field of Classification Search
CPC ........ G01V 1/46; G01V 1/50; G01V 2200/16; G01V 2210/6222; G01V 2210/641
See application file for complete search history.

(56) References Cited

U.S. PATENT DOCUMENTS

| 3,464,513 A | * | 9/1969 | Roever | ................. E21B 47/085 |
| | | | | 181/104 |
| 4,001,773 A | | 1/1977 | Lamel et al. | |
| 4,850,450 A | | 7/1989 | Hoyle et al. | |

(Continued)

FOREIGN PATENT DOCUMENTS

WO       9307514 A1    4/1993

OTHER PUBLICATIONS

Xiaoqing Sun, "A Study of Accoustic Emission in Drilling Applications", Rock Mechanics for Industry, 1999, AAC International, Lebanon, N.H., USA, 8 pages.

(Continued)

*Primary Examiner* — Regis J Betsch
(74) *Attorney, Agent, or Firm* — Bracewell LLP; Constance G. Rhebergen; Keith R. Derrington

(57) ABSTRACT

A system and method for acoustically profiling a wellbore while drilling, and which identifies depths in the wellbore where the wellbore diameter is enlarged or has highly fractured sidewalls. These depths are identified based on monitoring either travel time or signal strength of acoustic signals that propagate axially in the wellbore. Correlating wellbore depth to travel time of a signal traveling downhole inside of a drill string and uphole outside of the drill string yields an average signal velocity in the wellbore. Depths having a lower average signal velocity indicate where the wellbore diameter is enlarged or has highly fractured sidewalls. These depths are also identified by generating separate acoustic signals inside and outside of the drill string, (Continued)

comparing signal strengths of signals reflected from the wellbore bottom, and identifying the depths based on where there is an offset in the strengths of the reflected signals.

18 Claims, 9 Drawing Sheets

(56) References Cited

U.S. PATENT DOCUMENTS

| | | | | |
|---|---|---|---|---|
| 5,502,686 | A | * | 3/1996 | Dory .................... G01V 11/00 |
| | | | | 73/152.16 |
| 6,585,044 | B2 | | 7/2003 | Rester et al. |
| 6,634,426 | B2 | | 10/2003 | McCoy et al. |
| 7,004,252 | B2 | | 2/2006 | Vise |
| 7,207,397 | B2 | | 4/2007 | Miyamoto |
| 9,556,682 | B2 | | 1/2017 | Fuller et al. |
| 2015/0300161 | A1 | | 10/2015 | Kamata |
| 2018/0094521 | A1 | * | 4/2018 | Adamopoulos ........ G01V 1/308 |
| 2021/0048548 | A1 | * | 2/2021 | Chang ..................... G01V 1/50 |

OTHER PUBLICATIONS

PCT ISR and the Written Opinion of the International Searching Authority, issued in PCT/US2021/034648, dated Sep. 22, 2021, 12 pages.

\* cited by examiner

SYSTEM AND METHOD FOR ACOUSTICALLY IMAGING WELLBORE DURING DRILLING

BACKGROUND OF THE INVENTION

1. Field of Invention

The present disclosure relates to acoustically profiling a wellbore geometry while drilling.

2. Description of Prior Art

Hydrocarbon producing wellbores extend subsurface and intersect subterranean formations where hydrocarbons are trapped. The wellbores are usually formed by drilling systems that include a drill string made up of lengths of pipe connected to one another, and a drill bit mounted on an end of the interconnected pipes. The drill string is typically rotated by a top drive or rotary table disposed above the opening to the wellbore. Cutting elements on the drill bit scrape the bottom of the wellbore as the bit is rotated and excavate material thereby deepening the wellbore. Drilling fluid is typically pumped down the drill string and directed from the drill bit into the wellbore; the drilling fluid then flows back up the wellbore in an annulus between the drill string and walls of the wellbore. Cuttings are produced while excavating and are carried up the wellbore with the circulating drilling fluid. Solid particles entrained within the upward flowing drilling fluid include the cuttings and particles already resident in the drilling fluid; such as additives for adjusting drilling fluid properties.

Pressure of the drilling fluid flowing up the wellbore generally exceeds pressure in the adjacent formation. Due to the greater pressure in the wellbore the drilling fluid permeates a distance into the surrounding formation, which lines the wellbore with mudcake as the solid particles in the drilling fluid becomes deposited along the wellbore walls. The mudcake restricts fluid communication between the wellbore and formation. Seepage of fluid through the mudcake up to a point is usually not problematic, but occasionally cracks, fissures, or washouts occur along the wellbore walls through the mudcake to define openings in a wall of the wellbore. At times the cracks are from voids in the rock formation that were intersected by the bit, or result from large differences in pressure between the formation and the wellbore. Sometimes these openings allow free flow of fluid (lost circulation) between the wellbore and adjacent formation and form a lost circulation zone. Corrective action is generally undertaken in instances when the magnitude of lost circulation is sufficient to compromise well control.

The types of corrective action generally employed include adjusting drilling operations, varying properties of the drilling fluid, pumping lost circulation material ("LCM") downhole, plugging the wellbore with cement, or deploying a liner downhole to block the opening. Information about the depth of the circulation zone is useful when conducting each of these remediation efforts. As the fluid static head changes with depth in the wellbore, the depth at which the lost circulation zone is located sometimes dictates drilling fluid density and pressure of the lost circulation material being pumped downhole. Plugging the wellbore or deploying a liner generally requires the lost circulation zone depth be identified with some precision, otherwise the chances are increased that plugging or lining of the wellbore takes place at an incorrect depth.

SUMMARY OF THE INVENTION

Disclosed herein is an example method of acoustically profiling a wellbore while drilling, and which includes monitoring traversing acoustic signals in the wellbore that propagate inside a drill string that is disposed in the wellbore, that exit a lower end of the drill string and reflect from a bottom of the wellbore into an annulus outside of the drill string, and propagate in the annulus in a direction away from the bottom of the wellbore. The example method also includes obtaining velocities of the traversing acoustic signals when the bottom of the wellbore is at different depths as the wellbore is being drilled deeper, monitoring annulus acoustic signals that propagate within the annulus, and reflect from the bottom of the wellbore, monitoring drill string acoustic signals that propagate within the drill string and reflect from the bottom of the wellbore, and identifying depths in the wellbore having sidewalls with a discontinuity of surface based on monitoring one or more of the acoustic signals. The traversing acoustic signals are in one alternative generated by an acoustic transmitter disposed on surface and outside the wellbore, and are recorded by an acoustic receiver that is disposed on surface and outside the wellbore, and where the step of monitoring the traversing acoustic signals include recording the times when each traversing acoustic signal is generated and recorded, and where the step of obtaining velocities of the traversing acoustic signals includes obtaining a difference in time between when each traversing acoustic signal is generated and recorded to define a travel time for each traversing acoustic signal, and dividing each travel time by a distance traveled by the corresponding traversing acoustic signal. In this alternative, the discontinuities of surface are identified at depths at which velocities of the corresponding traversing acoustic signals are less than velocities of traversing acoustic signals that were obtained at adjacent lower depths and adjacent upper depths. In one alternative, the annulus acoustic signals are generated and recorded by an annulus acoustic transducer, where the drill string acoustic signals are generated and recorded by a drill string acoustic transducer, and where the annulus acoustic transducer and the drill string acoustic transducer are disposed on surface and outside of the wellbore. In this example, depths in the wellbore having sidewalls with a discontinuity of surface are identified by offsets in signal strength between the annulus acoustic signals and drill string acoustic signals that were recorded at a time when the wellbore bottom was located at the same depth. Examples of the discontinuity of surface include a location of comprised integrity and which includes a washout, a fissure, and a highly fractured area. The method further optionally includes remediating the wellbore in response to identification of the discontinuity of surface. In this example the step of remediating the wellbore involves maintaining control of the wellbore by one or more of adjusting wellbore pressure, adjusting a density of a drilling fluid introduced into the wellbore, adding a lost circulation material into the wellbore, cementing in the wellbore, and deploying a liner in the wellbore.

Another method of acoustically profiling a wellbore while drilling is disclosed which involves monitoring operation of a drilling system which has a drill string used for drilling the wellbore, generating traversing acoustic signals inside of the drill string that propagate downward in the drill string and exit a lower end the drill string, reflect from a bottom of the wellbore into an annulus that is around the drill string, and propagate upward in the annulus. The method of this example also includes obtaining a velocity for each traversing acoustic signal based on travel time prior to and after the traversing acoustic signal reflects from the bottom of the wellbore and identifying a discontinuity of surface in the wellbore based on velocities of the traversing acoustic signals and corresponding depths of the bottom of the wellbore when each traversing acoustic signal was propagating inside the wellbore. The discontinuity of surface in the wellbore is optionally identified at depths where velocities of the traversing acoustic signals are lower than at adjacent upper or lower depths. The traversing acoustic signals can be generated by a drill string acoustic transducer disposed outside of the wellbore, and wherein the traversing acoustic signals can be recorded by an annulus acoustic transducer and after being reflected from the bottom of the wellbore. The step of identifying a discontinuity of surface in the wellbore further optionally includes monitoring annulus acoustic signals that propagate axially within the annulus towards the bottom of the wellbore, and that reflect from the bottom of the wellbore to propagate within the annulus and towards an opening of the wellbore, monitoring drill string acoustic signals that propagate axially within the drill string towards the bottom of the wellbore, and that reflect from the bottom of the wellbore to propagate within the drill string and towards an opening of the wellbore, recording signal strengths of the annulus acoustic signals and of the drill string acoustic signals, and where the discontinuity of surface is identified at a depth where offsets are observed between the recorded signal strengths of the annulus acoustic signals and the drill string acoustic signals. The drill string acoustic transducer optionally generates the transverse acoustic signals and the drill string acoustic signals, and records the drill string acoustic signals that reflect from the bottom of the wellbore. Alternatively, the annulus acoustic transducer generates the annulus acoustic signals, and records the transverse acoustic signals that reflect from the bottom of the wellbore and the annulus acoustic signals that reflect from the bottom of the wellbore.

Disclosed herein is yet another method of acoustically profiling a wellbore while drilling, and which includes comparing signal strengths of annulus acoustic waves that propagate axially back and forth within an annulus that surrounds a drill string used for drilling the wellbore with signal strengths of drill string acoustic waves that propagate axially back forth within the drill string, locating offsets in magnitudes of the signal strengths between the annulus acoustic waves and the drill string acoustic waves, and identifying a depth at which a discontinuity of surface is present along a sidewall of the wellbore and based on the step of locating the offsets. Optionally, the depth at which the discontinuity of surface is identified corresponds to a depth of the bottom of the wellbore at a time when the annulus acoustic waves and drill string acoustic waves having the identified offsets were propagating respectively in the annulus and in the drill string. The method optionally further includes obtaining velocities of a series of traversing acoustic signals that propagate downward inside the drill string, exit a bottom end of the drill string, reflect from a bottom of the wellbore into the annulus, and propagate in the annulus away from the bottom of the wellbore, and where the discontinuity of surface in the wellbore is identified at a range of wellbore depths substantially equal to depths at which the bottom of the wellbore was located when velocities of the traversing acoustic signals were obtained that are less than that of adjacent upper and lower depths. In an example, a drill string acoustic transducer generates the drill string acoustic signals and the traversing acoustic signals, and records reflected drill string acoustic signals, and wherein an annulus acoustic transducer generates the annulus acoustic signals and records reflected traversing acoustic signals and reflected annulus acoustic signals.

BRIEF DESCRIPTION OF DRAWINGS

Some of the features and benefits of the present invention having been stated, others will become apparent as the description proceeds when taken in conjunction with the accompanying drawings, in which.

Figure 1:
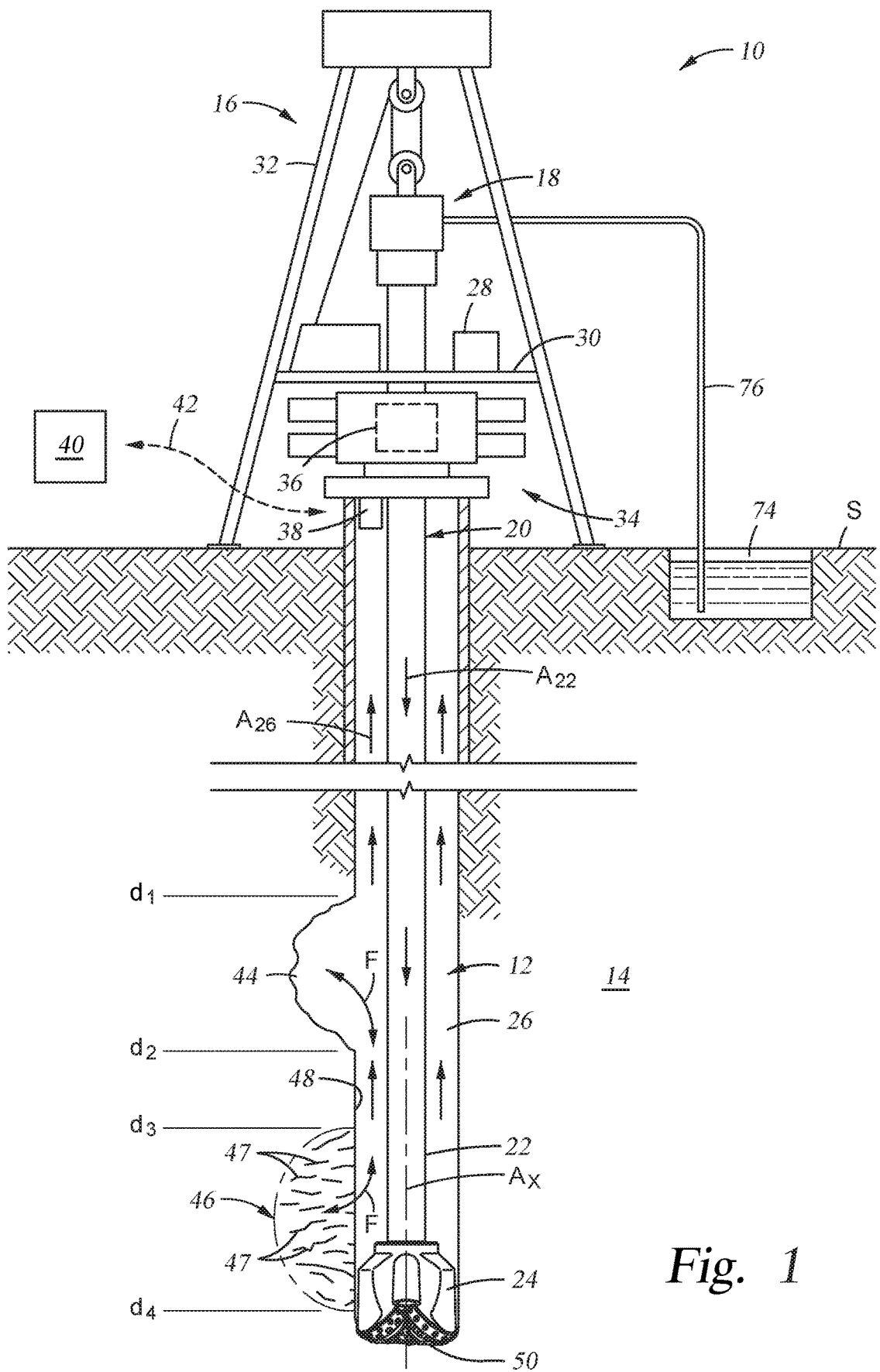
FIG. 1 is a side partial sectional elevational view of an example of acoustically profiling a wellbore while drilling.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side partial sectional view in FIG. 1 is an example of a drilling system 10 drilling a wellbore 12 into a formation 14. The drilling system 10 of FIG. 1 includes a drilling rig 16, which in the illustrated example has a drive means 18 for rotating a drill string 20 to excavate the wellbore 12. As shown, the drill string 20 includes lengths of drill pipe 22 that are coupled together in series, and a drill bit 24 on a lowermost end of the drill pipe 22. Rotating the drill string 20 with the drive means 18 engages teeth on the lower end of the drill bit 24 to excavate cuttings from the formation 14. An annulus 26 is formed between the drill pipe 22 and inner surface of wellbore 12. Optionally included with the drilling system 10 is a controller 28 within the rig 16 shown supported on a rig floor 30 disposed over an opening of the wellbore 12 and above surface S. The example rig 16 includes a derrick 32, which provides support for rig floor 30 and other hardware for conducting wellbore operations. A wellhead assembly 34 is shown mounted over an opening of wellbore 12 and on surface S, and which provides pressure control in the wellbore 12. Shown in a dashed outline and schematically represented are a drill string transducer 36 and an annulus transducer 38. A controller 40 is in the illustrated example and depicted in communication with the transducers 36, 38 via communications means 42. Examples of communication means 42 include hardwire, fiber optics, wireless, and telemetry and which convey data in the form of electrical or electromagnetic signals.

The wellbore 12 of FIG. 1 is shown having discontinuities of surface disposed at different depths along its length. Examples of a discontinuity of surface are provided in FIG. 1 which include a washout 44 and a fractured zone 46 having a number of fractures 47. The example washout 44 extends a radial distance from sidewall 48 of wellbore 12, and into the formation 14 in a direction away from an axis $A_X$ of wellbore 12. An upper end of washout 44 is at a depth $d_1$ in the wellbore 12, and has a lower end shown at depth $d_2$. An upper end of fractured zone 46 begins at depth $d_3$ and its lower end is at depth $d_4$. Fractures 47 in fractured zone 46 are made up of cracks or other breaks that create a change in the characteristic of the rock within the fractured zone 46. In an example one or both of the washout 44 and fractured zone 46 are sufficiently permeable so that fluid F communicates between wellbore 12 and formation 14. As is known, free communication of fluid from wellbore 12 into formation 14 in some instances compromises control of the wellbore 12 and alternatively is a source of lost drilling fluid. In the example of FIG. 1, at locations in the wellbore 12 away from washout 44 and fractured zone 46 there is no fluid communication between wellbore 12 and formation 14, or is within acceptable operational limits. In an alternative, away from washout 44 and fractured zone 46 a layer of mud cake is deposited along the sidewall 48 which serves as a flow barrier between the wellbore 12 and formation 14. Further illustrated in the example of FIG. 1 is arrow $A_{22}$ which represents a direction of a propagation of acoustic signals flowing downhole within drill pipe 22, and which reflect from a bottom 50 of wellbore 12 and into the annulus 26. When propagating within the annulus, a direction of the reflected acoustic signals is represented by arrows $A_{26}$.

Figure 2A:
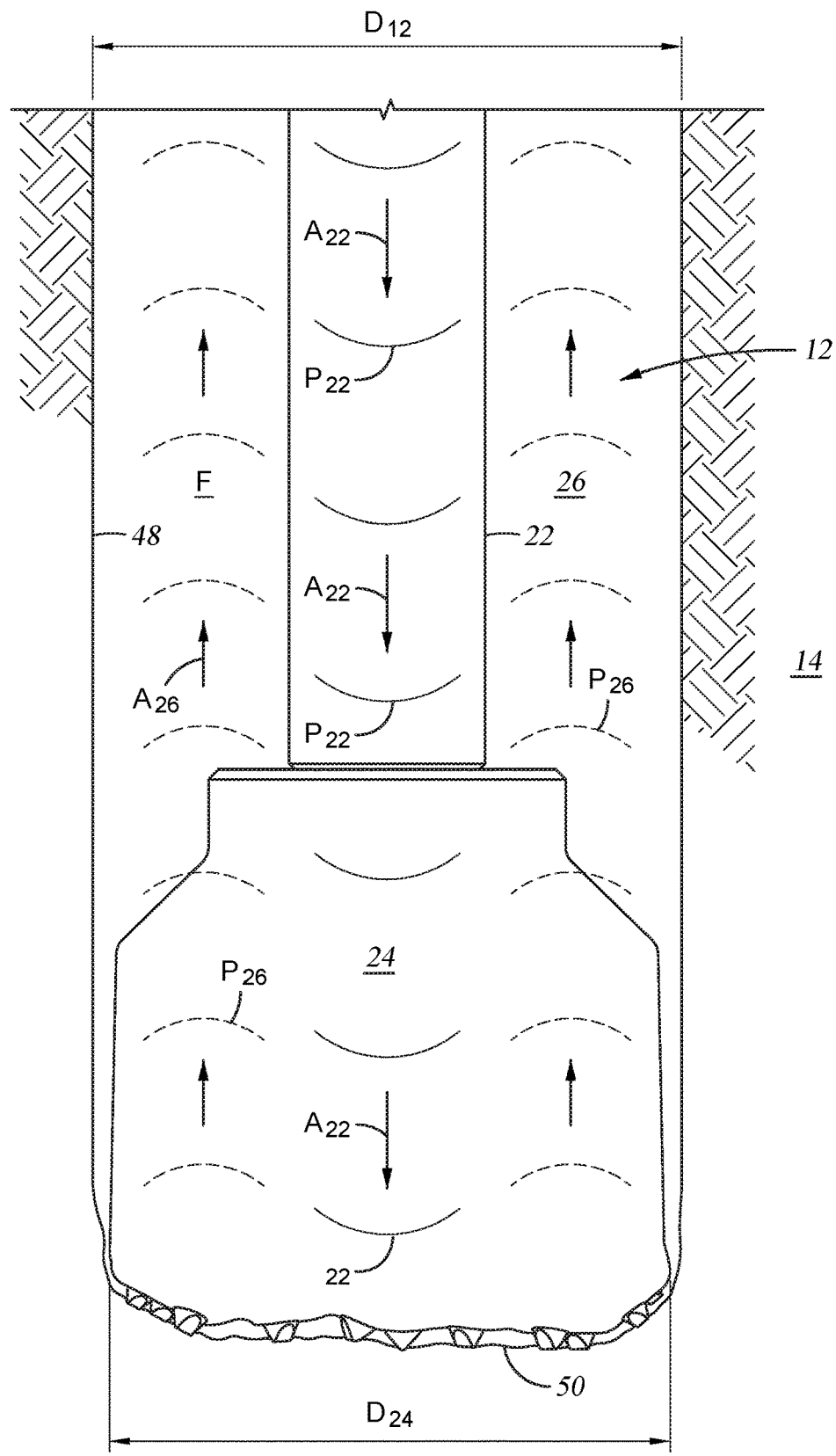
FIGS. 2A and 2B are side partial sectional elevational views of examples of profiling and drilling at different depths in the wellbore of FIG. 1.
Figure 2B:
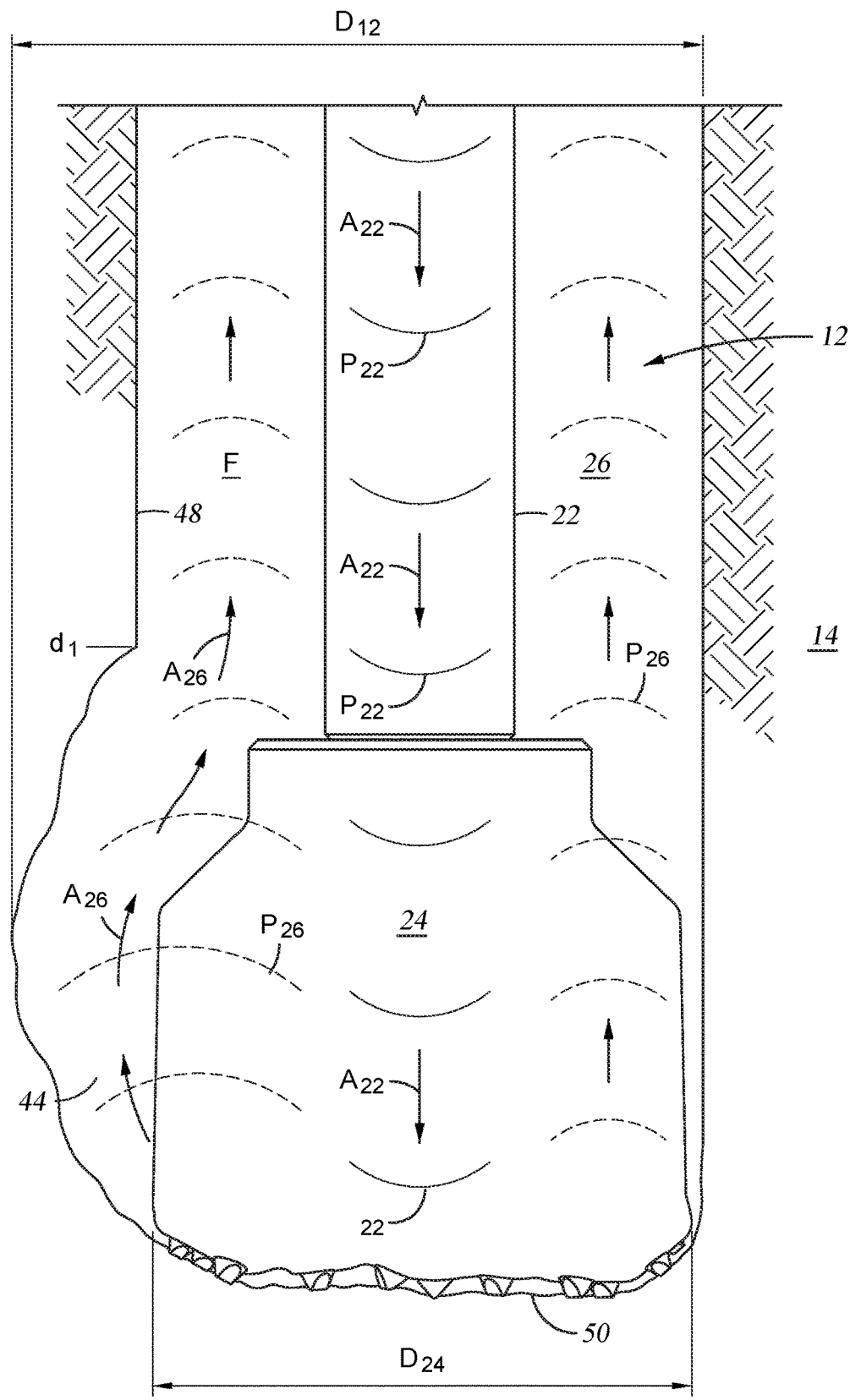

Referring now to FIGS. 2A and 2B, shown is a non-limiting example of operation of imaging within the wellbore 12 during drilling. Compressional waves $P_{22}$ are shown propagating within drill string 22, and which are the waves whose direction is represented by arrow $A_{22}$. In the example of FIG. 2A, exit the bottom end of the drill string 22 and reflect from the bottom of the wellbore 50 into the annulus 26. Compressional waves $P_{26}$ are shown which represent the reflected waves $P_{22}$ traveling up the annulus 26 and in the direction as shown by arrows $A_{26}$. For the purposes of illustration herein, compressional waves $P_{22}$, $P_{26}$ are referred to collectively as traversing acoustic waves. The example of FIG. 2A illustrates an example of forming wellbore 12 and along a portion that has no discontinuities of surface along its sidewall 48, instead the integrity of the sidewall 48 is generally constant and without areas which could provide a source of fluid flow between wellbore 12 and formation 14. Along this portion of wellbore 12 the diameter $d_{24}$ of the drill bit 24 is same as or substantially close to diameter $d_{12}$ of wellbore 12 and is in close contact with sidewall 48. The compressional waves $P_{26}$ shown in the example of FIG. 2A reflect from the wellbore bottom 50 and travel through the bit 24 prior to entering the annulus 26.

In the example of FIG. 2B the portion of wellbore 12 shown is being formed at a point in time different from that of FIG. 2A, and the wellbore bottom 50 is at a depth adjacent to washout 44 and past depth $d_1$. During this period of time, the compressional waves $P_{22}$ continue to propagate within the drill string 22, exit the bottom end of the string 22 and reflect from the wellbore bottom 50 back into the annulus 26 to form compressional waves $P_{26}$. As the washout 44 is adjacent the drill bit 24, an overall diameter $d_{12}$ of wellbore 12 exceeds the diameter $d_{24}$ drill bit 24. This enlarged diameter allows a space for the compressional waves $P_{26}$, and as schematically shown by arrow $A_{26}$, to pass around drill bit 24 through fluid F and back up into the annulus 26.

Figure 3:
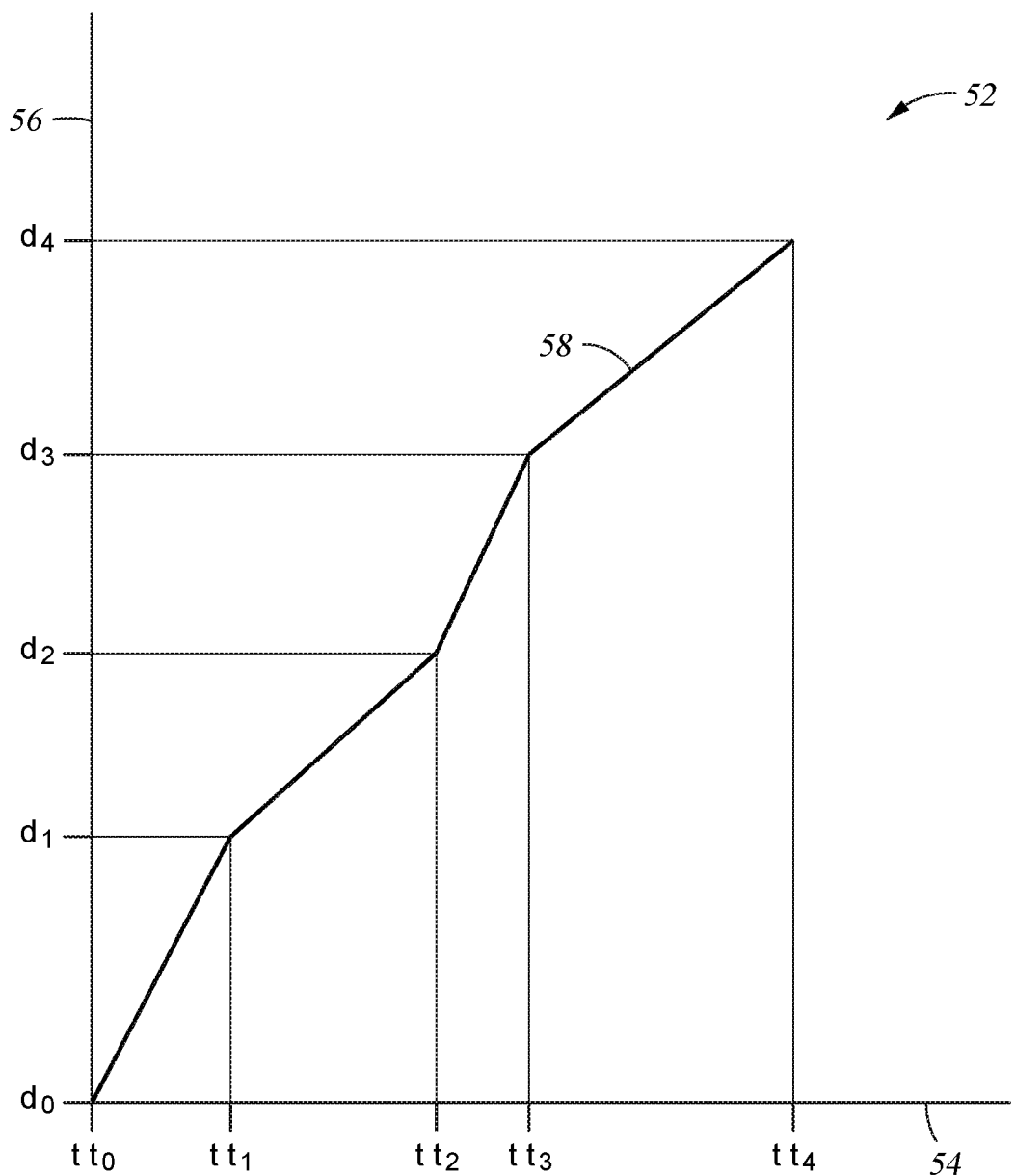
FIG. 3 is a graphical representation of examples of acoustic signal travel times obtained while a bottom of the wellbore of FIG. 1 is at different depths.

Shown in FIG. 3 is a graph 52 that graphically illustrates prophetic values of travel times of the traversing acoustic waves at different depths of the wellbore bottom 50. In this example the travel times include the period from when the traversing acoustic waves are generated, propagate downhole, reflect from the wellbore bottom 50, and propagate back uphole. An abscissa 54 in graph 52 represents travel time values ($tt_1$, $tt_2$, $tt_3$, $tt_4$) of the particular traversing acoustic waves (also referred to herein as signals) propagate within the wellbore 12. An ordinate 56 of graph 52 represents depths ($d_1$, $d_2$, $d_3$, $d_4$) of the location of the wellbore bottom 50 over the period of time where the travel times are being measured. Plot 58 is included in graph 52 that spans between points on graph 52 representing corresponding coordinates of travel times and wellbore bottom 50 depths. As shown, a slope of the plot 58 up to depth $d_1$ is greater than a slope of plot 58 between depths $d_1$ and $d_2$. This represents that the traversing acoustic wave velocities (which are obtained by simply dividing the distance traveled by the traversing acoustic signal by the travel time) is greater in those instances where the bit 24 is adjacent a discontinuity of surface. As further illustrated, plot 58 between depths $d_2$ and $d_3$ has a slope similar to $d_0$ to $d_1$, and greater than that between depths $d_1$ to $d_2$, indicating higher velocities of travel of the traversing acoustic signal. Further, the slope of plot 58 between depths $d_3$ to $d_4$ reflect a reduced slope and indicate the lowered velocity of the traversing acoustic signal due to encountering the fractured zone 46 when the bit 24 is adjacent that zone 46 and between depths $d_3$ and $d_4$. Not to be bound by theory, but it is believed that acoustic signal travel through the bit 24 is less than that through fluid due to the greater sound speed of the material making up the drill bit 24; so that travel times of the traversing acoustic wave (or signal) are increased when their path after being reflected from the wellbore bottom 50 bypasses the bit 24 and instead travels through fluid F. As the sound speed of fluid F is less than the sound speed through the bit 24, a velocity of the compressional wave $P_{26}$ returning back up the annulus to surface S (FIG. 1) is reduced over that of when the wellbore bottom 50 is at depths that are not adjacent a discontinuity of surface such as the washout 44 of FIG. 2B.

Figure 4:
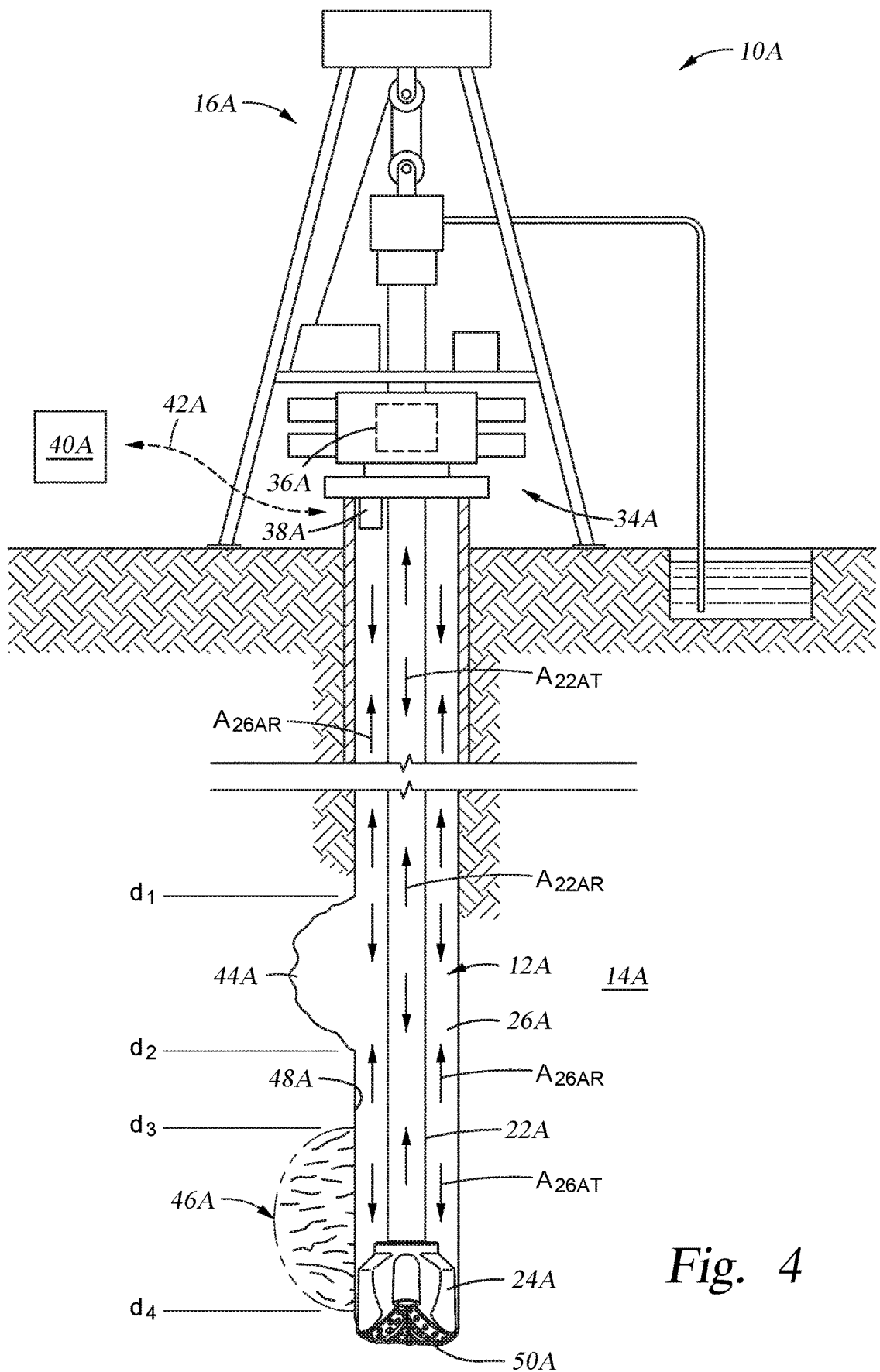
FIG. 4 is a side partial sectional elevational view of an alternate example of acoustically profiling a wellbore while drilling.

An alternative example of identifying locations of discontinuities of surface and a sidewall 48A of wellbore 12A is illustrated in a side partial sectional view in FIG. 4. In this example, the drill string transducer 36A generates compressional waves within drill string 22A. Arrow $A_{22AT}$ represents a downward direction of the compressional waves, and which in this example reflect from a wellbore bottom 50A and remain within drill string 22A. The reflected and upwardly directed waves have a direction represented by arrow $A_{22AR}$. Further in this example, annulus transducer 38A generates annulus acoustic waves that propagate downhole within annulus 26A and have a direction as represented by arrow $A_{26AT}$. Similarly, the annulus acoustic signals reflect from wellbore bottom 50A and travel back up annulus 26A and in a direction represented by arrow $A_{26AR}$. In this example, the drill string transducer 36A records the reflected drill string acoustic signals, and the annulus transducer 38A records reflected annulus acoustic signals.

Figure 5A:
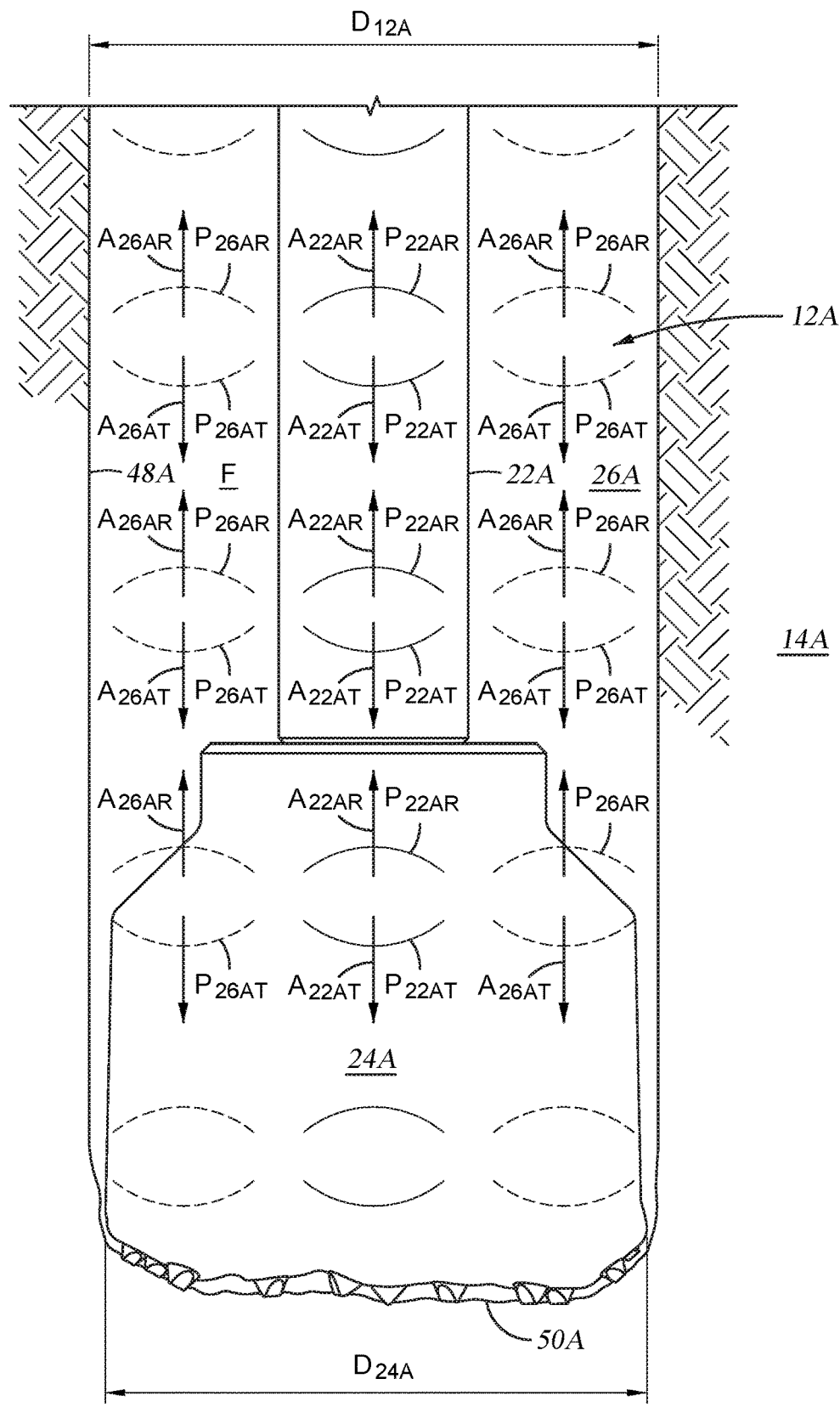
FIGS. 5A and 5B are side partial sectional elevational views of examples of profiling and drilling at different depths in the wellbore of FIG. 4.
Figure 5B:
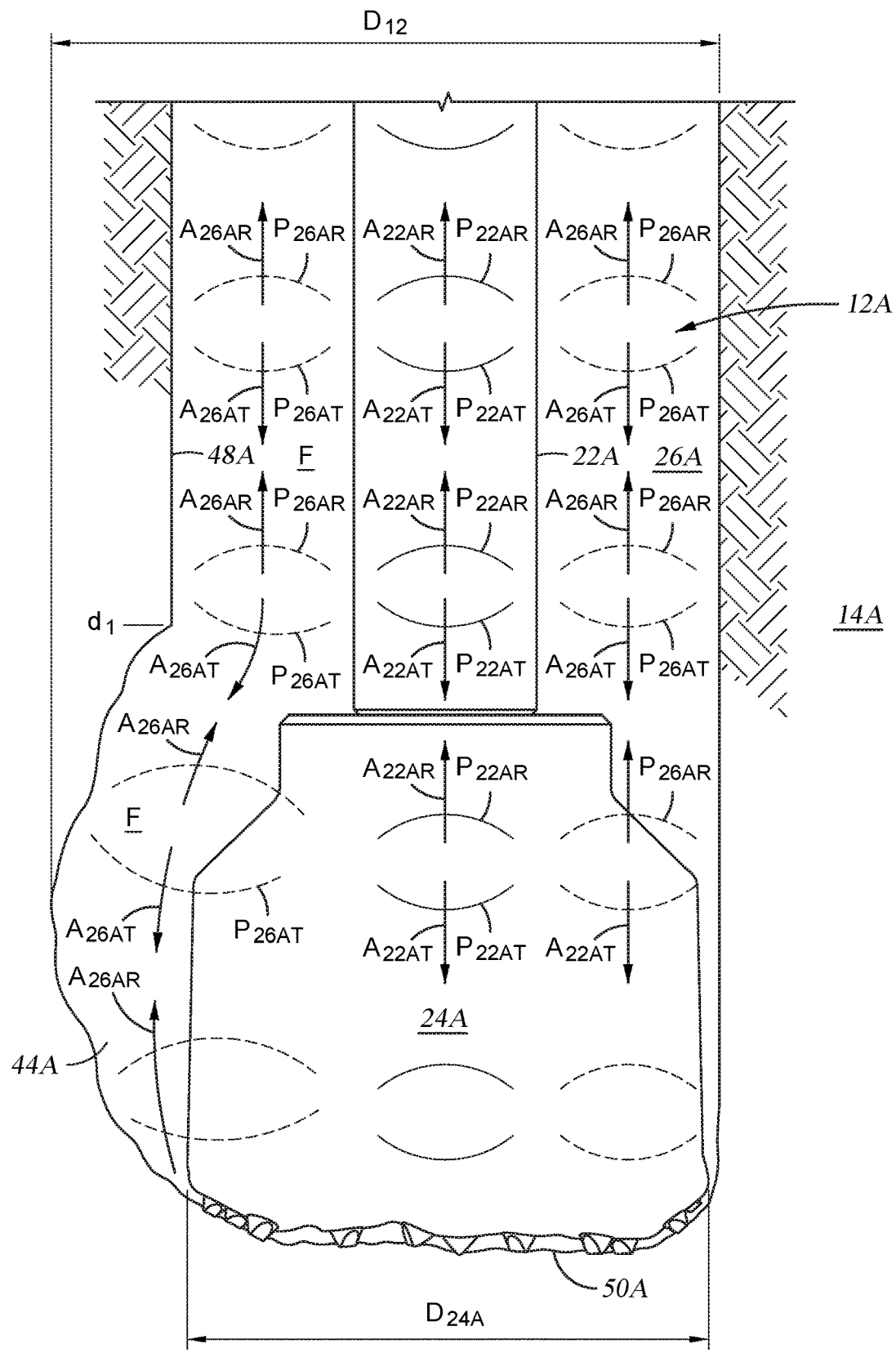

FIGS. 5A and 5B are side sectional views of examples of the drilling system 10A of FIG. 4 forming different portions of wellbore 12A through formation 14A. In FIG. 5A, the sidewall 48A of wellbore 12A remains substantially consolidated and without any discontinuities of surface. In the example of FIG. 5A drill string transducer 36A generates compressional waves $P_{22AT}$ shown traveling downhole within drill string 22A, and which reflect from the wellbore bottom 50 to form reflected compressional waves $P_{22AR}$ that propagate upward within drill string 22A. Further depicted in the example of FIG. 5A is that compressional waves $P_{26AT}$, that generated by annulus transducer 38A propagate downhole with an annulus 26A, and reflect from the wellbore bottom 50A to form reflected compressional waves $P_{26AR}$ that travel uphole within annulus 26A. Collectively the compressional waves $P_{22AT}$, $P_{22AR}$ define drill string acoustic signals, and compressional waves $P_{26AT}$, $P_{26AR}$ define annulus acoustic signals. Further shown in FIG. 5A is that a diameter $d_{24A}$ of drill bit 24A is substantially the same as diameter $d_{12A}$ of wellbore 12A, so that bit 24A is in the path of the waves $P_{26AT}$ so that upwardly and downwardly propagating annulus acoustic signals pass through the bit 24A. Referring now to FIG. 5B, the propagation of the drill string acoustic signals is substantially the same as that of FIG. 5A. However, in FIG. 5B drill bit 24A is adjacent washout 44A which provides a bypass around the bit 24A and through fluid F for the annulus acoustic signals that propagate downhole within annulus 26A and reflect from wellbore bottom 50A back to surface. The presence of washout 44A also increases a localized cross sectional area of the annulus 26A, which in turn increases a volume of transmission medium through which the annulus acoustic signal propagates.

Figure 6:
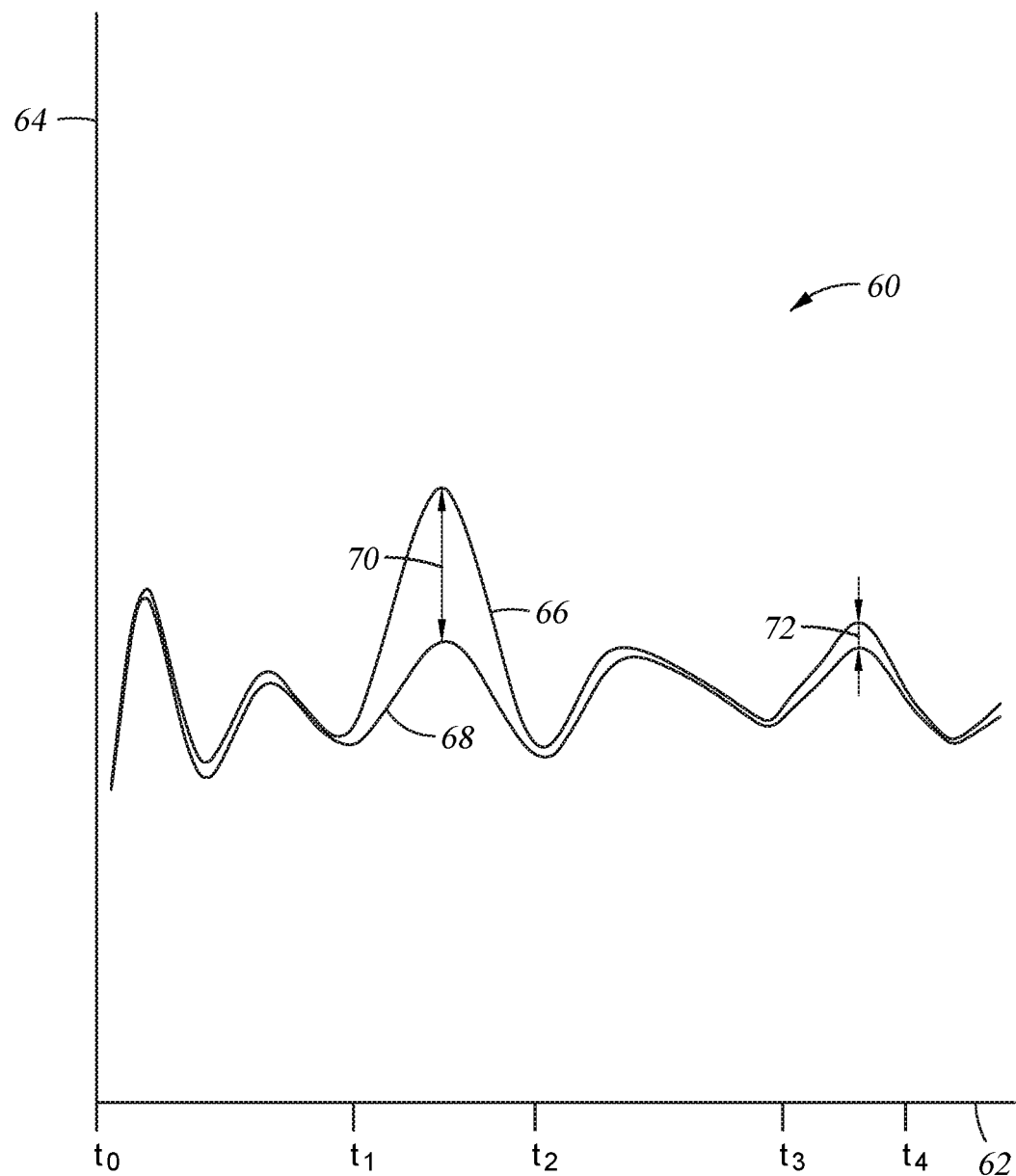
FIG. 6 is a graphical representation of examples of acoustic responses obtained while drilling the wellbore of FIG. 4.

FIG. 6 is a graphical representation of examples of prophetic signal strengths of the drill string acoustic signals and the annulus acoustic signals, and recorded after both have propagated a distance downhole within wellbore and back uphole. In FIG. 6 is a graph 60 having an abscissa 62 that represents time over which the wellbore 12A is being drilled. Ordinate 64 represents magnitudes of the signal strength of the drill string acoustic signals and an annulus acoustic signals and recorded after having been reflected from wellbore bottom 50A (FIG. 5B). Included in graph 60 is a plot 66 which represents a recorded signal strength of the drill string acoustic signals that were generated and recorded over a period of time when the wellbore 12A (FIG. 4) was being formed. Similarly, plot 68 represents signal strengths of annulus acoustic signals that were generated and recorded and at substantially the same time as the generation and recording of the drill string acoustic signals represented in plot 66. For the purposes of illustrates time coordinates $t_1$, $t_2$, $t_3$, $t_4$ are included with the ordinate 64. Further illustrated in FIG. 6 are offsets 70, 72 which represent differences in the respective signal strengths of the drill string and annulus acoustic signals. The offsets 70, 72 provide an indication of resulting recorded signal strengths at times when the drill bit 24A and wellbore bottom 50A (FIG. 4) were adjacent one of the discontinuities of surface such as the washout 44A or fractured zone 46A. Referring back to FIG. 5B, and not to be bound by theory, but it is believed that the extra volume afforded by the washout 44A (or fractured zone 46A) provide a space for attenuation of the annulus acoustic signal and which results in a temporary lowering of the recorded signal strength, and as represented in FIG. 6. For the purposes of illustration, offset 70 schematically illustrates a period of time when the bottom of wellbore 50A is adjacent washout 44A, and offset 72 represents a period of time when drill bit 24A is adjacent the fractured zone 46A. In a non-limiting example of operation, both imaging techniques described above are conducted while drilling a particular wellbore and are used for identifying discontinuities of surface in the wellbore in conjunction with one another.

Figure 7:
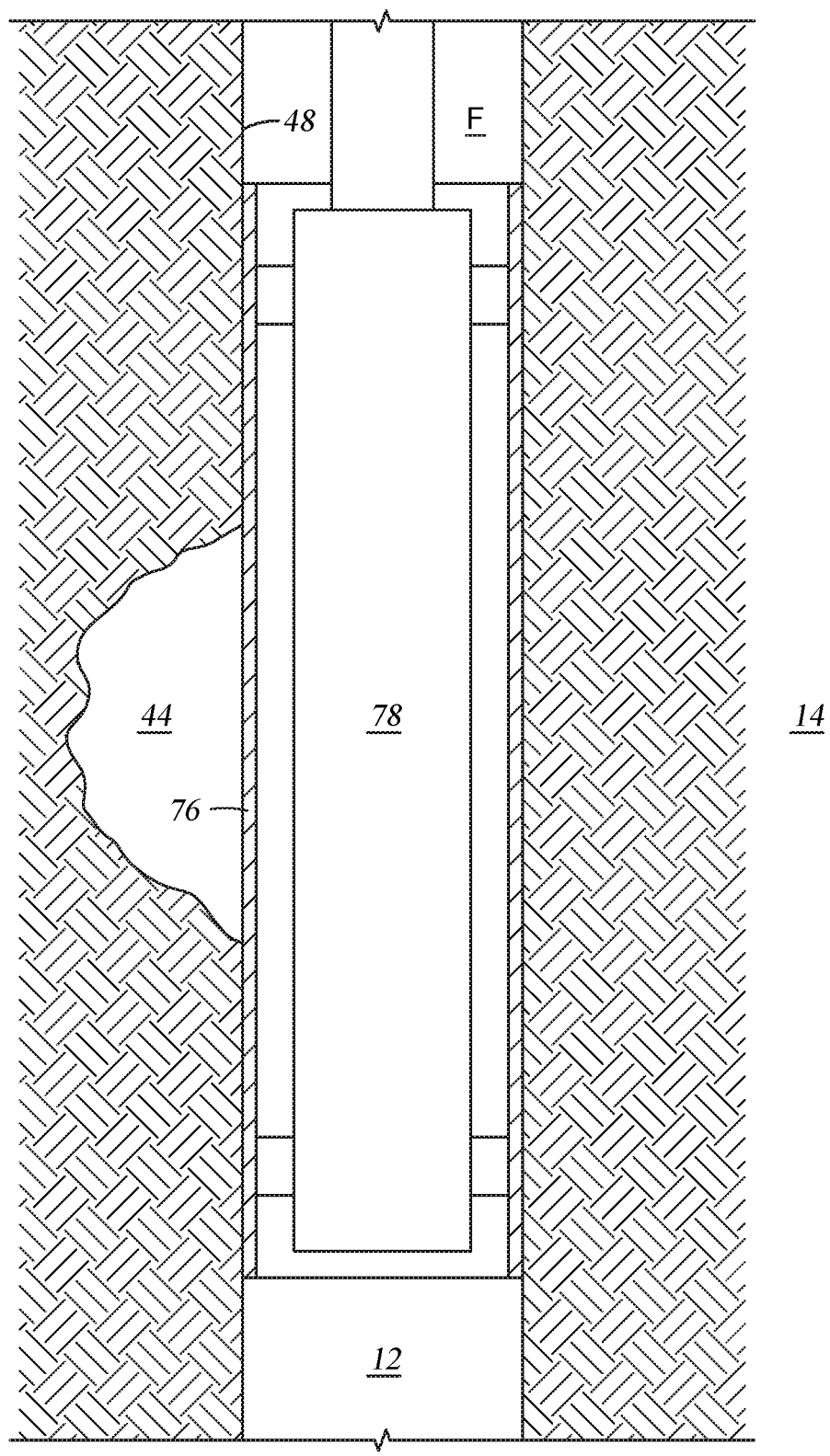
FIG. 7 is a side partial sectional elevational view of an example of remediating a lost circulation zone in the wellbore of FIG. 1.

In an alternative, remediation is conducted upon identifying the presence and depth of a discontinuity of surface along the sidewall 48 of wellbore 12. Examples of remediation include maintaining control of the wellbore 12, 12A (FIGS. 1 and 4), alternatives of which include adjusting wellbore pressure, adjusting the density of the drilling fluid that is introduced into the wellbore, filling the discontinuity of surface with a lost circulation material, and deploying a liner into the wellbore. Referring back to FIG. 1, a schematic example of a mud pit 74 is shown with a line 76 that delivers a drilling mud or drilling fluid into drilling means 18 and which is delivered into the drill string 20. In an example, density of mud or drilling fluid within the mud pit 74 is adjusted to maintain control of the wellbore. Alternatively, a liner 76 which is shown in FIG. 7 is installed within wellbore 12 and adjacent the washout 44. Alternatively, liner 76 is set adjacent the fractured zone 46. In this example, a running tool 78 is used for deploying liner 76 and which prevents a flow of fluid F into the adjoining formation 14.

In a non-limiting example of operation, wellbore 12 of FIG. 1 is being drilled with the drilling system 10 and at the same time acoustic signals are generated that propagate within the drill string 22 and annulus 26. Examples of traversing acoustic signals are formed by drill string transducer 36 which propagate downhole within drill string 22 exit the bottom end of drill string 22 reflect from wellbore bottom 50 into the annulus 26 and propagate back to surface S and are recorded by the annulus transducer 38. Alternatives exist where the means for generating and recording the acoustic signals are disposed within wellbore 12 and below surface S. In an embodiment, the drill string transducer 36A generates the traversing acoustic signal and the drill string acoustic signal and records the reflected drill string acoustic signal; optionally in this embodiment, the traversing acoustic signal is recorded by the annulus transducer 38A, and the annulus acoustic signals are generated and recorded by the annulus transducer 38A. The overall travel times of the traversing acoustic signals are obtained based upon knowledge of when a particular acoustic signal is generated and when its corresponding reflected signal is recorded. In an alternative, the acoustic signal travel distance is obtained by summing downward and upward travel distance of the acoustic signal, where downward travel distance is from where the traversing acoustic signals are generated to the wellbore bottom 50, and the upward travel distance is from the wellbore bottom 50 to where the traversing acoustic signals are recorded. In one example the travel distance is based on lengths of the drill string 22 and drill bit 24. Knowing the overall time travel and travel distance of the acoustic signal, an average velocity is obtained along with the overall travel time. Further in this example, the average velocity values are recorded over the period of time wellbore 12 is being drilled, and a correlation is obtained which reflects depth of the wellbore bottom 50 with the travel time for each acoustic signal to propagate down and up in the wellbore 12. In an embodiment, discontinuities of surface (i.e., washout, fractured zone) are identified and their locations in the wellbore estimated based on analyzing average velocities of the traversing acoustic signal is analyzed with respect to depth, and when average velocities of particular traversing acoustic signals become reduced within a particular range of depths of the wellbore bottom. Similarly, acoustic signals that are generated respectively within the drill string and the annulus are monitored and their strength recorded when reflected back to surface yield indications of discontinuities of surface when there is a difference of magnitude of signal strength recorded between the drill string acoustic signals and annulus acoustic signals.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of acoustically profiling a wellbore while drilling comprising:
    monitoring traversing acoustic signals in the wellbore that propagate inside a drill string that is disposed in the wellbore, that exit a lower end of the drill string and reflect from a bottom of the wellbore into an annulus outside of the drill string, and propagate in the annulus in a direction away from the bottom of the wellbore;
    obtaining velocities of the traversing acoustic signals when the bottom of the wellbore is at different depths as the wellbore is being drilled deeper;
    monitoring annulus acoustic signals that propagate within the annulus, and reflect from the bottom of the wellbore;
    monitoring drill string acoustic signals that propagate within the drill string and reflect from the bottom of the wellbore; and
    identifying depths in the wellbore having sidewalls with a discontinuity of surface based on monitoring one or more of the acoustic signals.

2. The method of claim 1, wherein the traversing acoustic signals are generated by an acoustic transmitter disposed on surface and outside the wellbore, and are recorded by an acoustic receiver that is disposed on surface and outside the wellbore, and wherein the step of monitoring the traversing acoustic signals comprises recording times when each traversing acoustic signal is generated and recorded, and wherein the step of obtaining velocities of the traversing acoustic signals comprises obtaining a difference in time between when each traversing acoustic signal is generated and recorded to define a travel time for each traversing acoustic signal, and dividing each travel time by a distance traveled by the corresponding traversing acoustic signal.

3. The method of claim 2, wherein the discontinuities of surface are identified at depths at which velocities of the corresponding traversing acoustic signals are less than velocities of traversing acoustic signals that were obtained at adjacent lower depths and adjacent upper depths.

4. The method of claim 1, wherein the annulus acoustic signals are generated and recorded by an annulus acoustic transducer, wherein the drill string acoustic signals are generated and recorded by a drill string acoustic transducer, and wherein the annulus acoustic transducer and the drill string acoustic transducer are disposed on surface and outside of the wellbore.

5. The method of claim 4, wherein depths in the wellbore having sidewalls with a discontinuity of surface are identified by offsets in signal strength between the annulus acoustic signals and drill string acoustic signals that were recorded at a time when the wellbore bottom was located at the same depth.

6. The method of claim 1, wherein the discontinuity of surface comprises a location of comprised integrity and that is selected from the group consisting of a washout, a fissure, and a highly fractured area.

7. The method of claim 1, further comprising remediating the wellbore in response to identification of the discontinuity of surface.

8. The method of claim 7, wherein the step of remediating the wellbore comprises maintaining control of the wellbore and that is selected from the group consisting of adjusting wellbore pressure, adjusting a density of a drilling fluid introduced into the wellbore, adding a lost circulation material into the wellbore, cementing in the wellbore, and deploying a liner in the wellbore.

9. A method of acoustically profiling a wellbore while drilling comprising:
    monitoring operation of a drilling system that comprises a drill string used for drilling the wellbore;
    generating traversing acoustic signals inside of the drill string that propagate downward in the drill string and exit a lower end the drill string, reflect from a bottom of the wellbore into an annulus that is around the drill string, and propagate upward in the annulus;
    obtaining a velocity for each traversing acoustic signal based on travel time prior to and after the traversing acoustic signal reflects from the bottom of the wellbore; and
    identifying a discontinuity of surface in the wellbore based on velocities of the traversing acoustic signals and corresponding depths of the bottom of the wellbore when each traversing acoustic signal was propagating inside the wellbore.

10. The method of claim 9, wherein the discontinuity of surface in the wellbore is identified at depths where velocities of the traversing acoustic signals are lower than at adjacent upper or lower depths.

11. The method of claim 9, wherein the traversing acoustic signals are generated by a drill string acoustic transducer disposed outside of the wellbore, and wherein the traversing acoustic signals are recorded by an annulus acoustic transducer and after being reflected from the bottom of the wellbore.

12. The method of claim 11, wherein the step of identifying a discontinuity of surface in the wellbore further comprises,
    monitoring annulus acoustic signals that propagate axially within the annulus towards the bottom of the wellbore, and that reflect from the bottom of the wellbore to propagate within the annulus and towards an opening of the wellbore, monitoring drill string acoustic signals that propagate axially within the drill string towards the bottom of the wellbore, and that reflect from the bottom of the wellbore to propagate within the drill string and towards an opening of the wellbore, recording signal strengths of the annulus acoustic signals and of the drill string acoustic signals, and wherein the discontinuity of surface is identified at a depth where offsets are observed between the recorded signal strengths of the annulus acoustic signals and the drill string acoustic signals.

13. The method of claim 12, wherein the drill string acoustic transducer generates the transverse acoustic signals and the drill string acoustic signals, and records the drill string acoustic signals that reflect from the bottom of the wellbore.

14. The method of claim 12, wherein the annulus acoustic transducer generates the annulus acoustic signals, and records the transverse acoustic signals that reflect from the bottom of the wellbore and the annulus acoustic signals that reflect from the bottom of the wellbore.

15. A method of acoustically profiling a wellbore while drilling comprising:

comparing signal strengths of annulus acoustic waves that propagate axially back and forth within an annulus that surrounds a drill string used for drilling the wellbore with signal strengths of drill string acoustic waves that propagate axially back forth within the drill string;

locating offsets in magnitudes of the signal strengths between the annulus acoustic waves and the drill string acoustic waves; and identifying a depth at which a discontinuity of surface is present along a sidewall of the wellbore and based on the step of locating the offsets.

16. The method of claim 15, wherein the depth at which the discontinuity of surface is identified corresponds to a depth of the bottom of the wellbore at a time when the annulus acoustic waves and drill string acoustic waves having the identified offsets were propagating respectively in the annulus and in the drill string.

17. The method of claim 15, further comprising, obtaining velocities of a series of traversing acoustic signals that propagate downward inside the drill string, exit a bottom end of the drill string, reflect from a bottom of the wellbore into the annulus, and propagate in the annulus away from the bottom of the wellbore, and wherein the discontinuity of surface in the wellbore is identified at a range of wellbore depths substantially equal to depths at which the bottom of the wellbore was located when velocities of the traversing acoustic signals were obtained that are less than that of adjacent upper and lower depths.

18. The method of claim 17, wherein a drill string acoustic transducer generates the drill string acoustic signals and the traversing acoustic signals, and records reflected drill string acoustic signals, and wherein an annulus acoustic transducer generates the annulus acoustic signals and records reflected traversing acoustic signals and reflected annulus acoustic signals.

* * * * *